United States Patent [19]
Asano

[11] Patent Number: 5,297,856
[45] Date of Patent: Mar. 29, 1994

[54] TWO SEPARATE HIGH SPEED AND LOW SPEED DISC BRAKE UNITS FOR RAILWAY VEHICLES

[75] Inventor: Yoshio Asano, Kobe, Japan

[73] Assignee: Nippon Air Brake Co., Ltd., Kobe, Japan

[21] Appl. No.: 982,538

[22] Filed: Nov. 27, 1992

[30] Foreign Application Priority Data

Dec. 12, 1991 [JP] Japan .................... 3-352213

[51] Int. Cl.⁵ .............................. B60T 13/00
[52] U.S. Cl. .................... 303/9.61; 188/71.1; 188/106 P; 188/153 R; 303/6.01; 303/13; 303/15
[58] Field of Search ......... 303/9.61, 15, 3, 14, 303/16, 20, 7-8, 6.01, 117.1, 118.1, 119.1, 101, 91, 100, 93; 188/181 R, 106 P, 1.11, 71.1, 354, 382, 156, 153 R, 107

[56] References Cited

U.S. PATENT DOCUMENTS

| | | | |
|---|---|---|---|
| 2,160,209 | 5/1939 | Canetta | 303/101 |
| 3,944,287 | 3/1976 | Nagase | 303/15 |
| 4,619,348 | 10/1986 | Smith | 188/153 R X |
| 4,671,576 | 6/1987 | Fourie | 303/101 X |
| 4,923,056 | 5/1990 | Nedelk | 188/71.1 |
| 4,986,610 | 1/1991 | Beck et al. | 188/106 P X |
| 5,172,960 | 12/1992 | Chareire | 303/9.61 X |

*Primary Examiner*—Douglas C. Butler
*Attorney, Agent, or Firm*—John B. Sotak

[57] ABSTRACT

A railroad car brake system, comprising, a pneumatic-to-hydraulic transducer connected to a brake control unit for developing braking pressure in response to a brake command request, and a plurality of disc brake units connected to the pneumatic-to-hydraulic brake pressure transducer and being characterized by the fact that the disc brake units are divided into high speed disc brake units and low speed disc brake units and a control valve is installed between the brake pressure transducer and the disc brake units so that the pressurized fluid may be supplied from the brake pressure transducer either to the high speed disc brake units, or to the low speed disc brake units.

11 Claims, 3 Drawing Sheets

TWO SEPARATE HIGH SPEED AND LOW SPEED DISC BRAKE UNITS FOR RAILWAY VEHICLES

FIELD OF THE INVENTION

The present invention relates to a railroad car brake arrangement which is effectively suitable for use in either a high speed or a low speed running mode of operation, and including a pneumatic-to-hydraulic brake pressure transducer for appropriately supplying hydraulic pressure to either high speed brake units or low speed brake units under control of an electromagnetic control valve.

BACKGROUND OF THE INVENTION

In recent years, the speeds of railroad cars, particularly on passenger transit vehicles, have dramatically increased. One of the former braking systems which was utilized on these new high speed vehicles is schematically shown and described in Japanese Patent Publication (Kokai) 2-262,459. An example of such a braking system is shown in FIG. 2 of the subject application. In viewing FIG. 2, it will be seen the system includes a brake command controller 1 having an operating handle 1a which is located within easy reach of the engineer or train operator. The operating handle 1a is manually moved or rotated to one of a plurality of selected positions to initiate the desired braking control level or brake command request. The particular position of the rotatable handle 1a is converted into an electrical signal by a suitable encoding device and is conveyed to a conductive command line 2. The electrical lead 2 is connected to a brake control unit 3 which converts the above-mentioned electrical brake command signal into a proportional air pressure signal. The pneumatic signal Bca is responsive and proportional to the load and/or the rotational speed of the railway vehicle. A plurality of the wheels booster cylinders 5 receives and converts the pneumatic pressure signal Bca into a proportional hydraulic pressure signal Bco. The hydraulic pressure signals Bco are fed to the respective pair of brake cylinders 4. That is, the four booster cylinders 5 are connected to each of the four pairs of brake force cylinders 4 carried by a single railroad car. Namely, the eight brake force cylinders 4 are arranged in pairs for each of the four individual booster cylinder 5.

As shown in FIG. 3, each booster cylinder 5 receives the pneumatic pressure signal Bca obtained from the above-mentioned brake control unit 3. The pneumatic pressure signal Bca is conveyed to a pneumatic cylinder chamber 13 of a pneumatic cylinder 11 via a valve 10. The pneumatic cylinder 11 includes a piston member 14 which is urged against the compressive force of a return spring 15. A piston rod 16 which is integral with the piston 14 displaces the oil into hydraulic cylinder chamber 17 so as to produce an oil pressure signal Bco. This hydraulic pressure signal Bco is transmitted to a brake force cylinders 4 via an anti-skid control valve 18 for developing an appropriate brake force. As shown in FIG. 3, the reference numeral 19 designates an oil reservoir. The brake force cylinders 4 are hydraulic devices which are normally employed in a conventional railway disc brake system.

The type of brake disc which is suitable for use in a railroad disc brake assembly is a conventional brake disc as used on standard railroad systems. However, as the speed of the railroad cars is increased, the conventional disc brakes prove to be inadequate, because they are unable to develop sufficient braking force to control the fast moving vehicles. The heat capacity of conventional brake shoes is insufficient, and secondly the coefficient of friction of conventional brake shoes falls sharply.

Accordingly, it is proposed to solve these problems by increasing the number of the above-described disc brake assemblies. However, such a solution normally requires an extremely large quantity of pressurized fluid for supplying the brake control units and to the booster cylinders. Also, such a proposal leads to the increased overall dimensions of the braking equipment. Another solution has been proposed in which to maintain a coefficient of friction at a certain value even at high temperatures by using new materials for brake discs and brake pads, such as carbonaceous-type materials. However, it has been found that these materials which possess resistance to heat normally have an unstable coefficient of friction, when the temperature of the brake disc falls during low speed running. This, in turn, results in an unstable braking force at low or moderate speeds.

OBJECTS AND SUMMARY OF THE INVENTION

Accordingly, it is an object of this invention to provide a railroad brake system for effectively braking railway vehicles that are traveling at either high or low speeds.

A further object of the present invention is to provide a railroad car brake arrangement suitable for running at high speeds without the necessity of increasing the amount of pressurized fluid which is supplied to the brake control unit and to the booster cylinders.

Another object of this invention is to provide a railroad car brake arrangement comprising: a pneumatic-to-hydraulic brake pressure transducer which is connected to a brake control unit for developing braking pressure in response to a particular brake command request, and a plurality of disc brake units are connected to the pneumatic-to-hydraulic brake transducer, the arrangement being characterized by the fact that the disc brake units are divided into high speed disc brake units and low speed disc brake units, and in that a control valve is connected between the brake transducer and the disc brake units so that the pressurized fluid may be selectively supplied from the brake pressure transducer either to the high speed disc brake units or to the low speed disc brake units.

It will be appreciated that the disc brake units may be divided by means of operation of the electromagnetic control valve into two groups of disc brake units. It has been found that it becomes possible, without appreciably increasing the amount of the pressurized fluid sent to the brake units and to their respective cylinders to provide operating conditions suitable both for high speed running and for low speed running. By employing different brake shoe material for the separate disc brake units, it is possible to operate without any decrease in the coefficient of friction even when the railway vehicle is decelerating from a high speed level. Conversely, by employing conventional brake shoe material for the other disc brake units, it becomes possible, by means of using the control valve, to connect the supply of pressurized oil in response to the changing speed of the railroad cars, either to special disc brake units for high speed operation, or to the conventional disc brake units for low speed operation. It is possible to maintain and sustain the required braking forces on the railroad vehicles for effective controlled deceleration.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
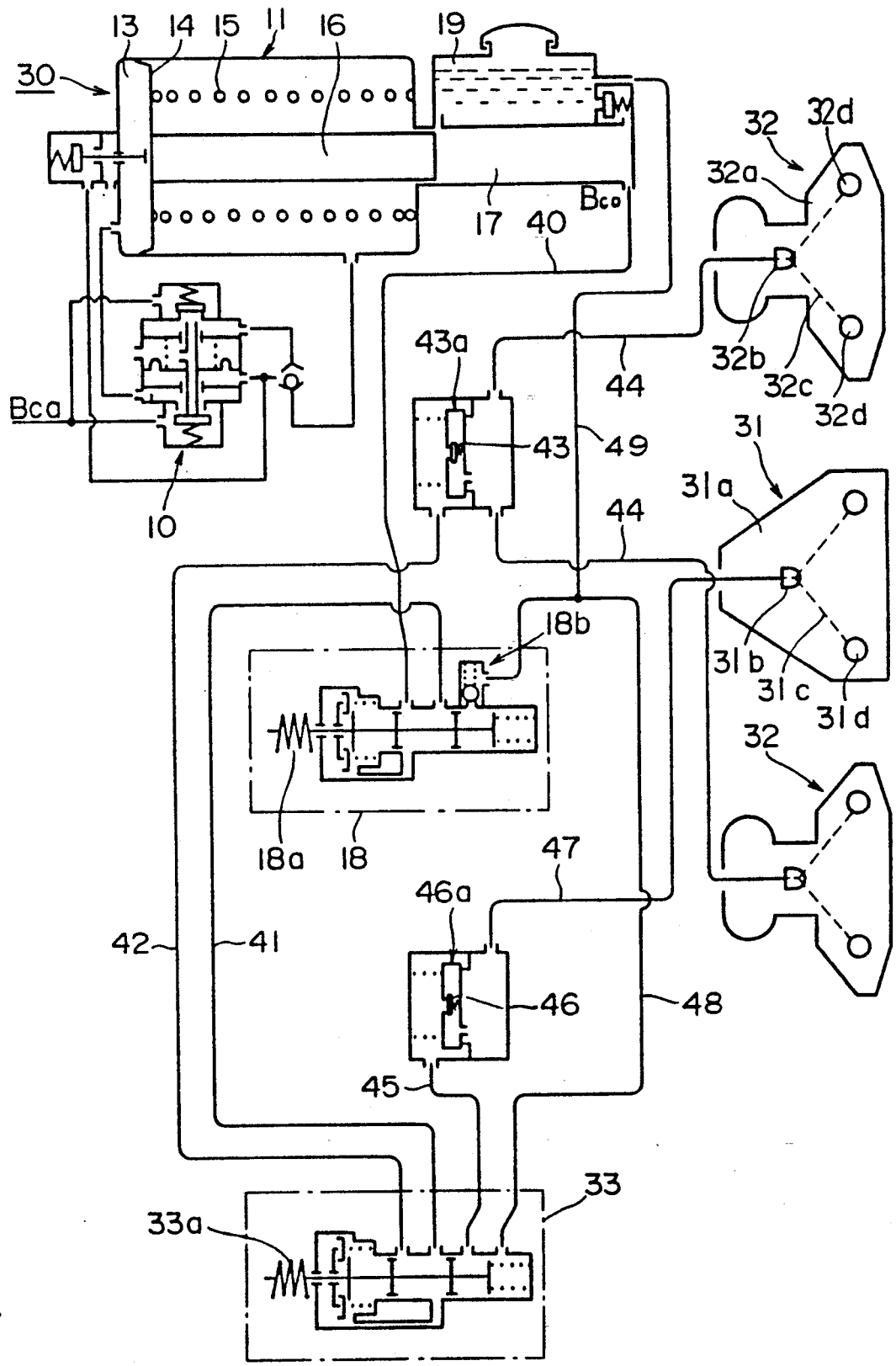
FIG. 1 is a diagrammatical representation of a braking system for the high and low speed disc brake units of one of the wheels of railway vehicles in accordance with the present invention.

The disc brake arrangement will be further described with reference to FIG. 1 which illustrates a preferred embodiment of the present invention. The illustrated railroad car brake assembly includes a pneumatic-to-hydraulic pressure transducer 30 and a disc brake unit 31 for operation when the railroad vehicle is traveling at a high rate of speed. The specific number of high speed disc brake units that are used per car and/or wheel is dependent upon the size, weight, and speed of the particular railway vehicle. It will be seen that another set of disc brake units 32 is activated when the railroad car is traveling at a moderate or low rate of speed as will be described hereinafter. As shown in FIG. 1, the hydraulic system of the disc brake arrangement includes an electromagnetically operated control valve 33, an anti-skid control valve 18 and a pair of check valves 43 and 46, piston member 31d and 32d, as well as the necessary piping and connections.

Figure 3:
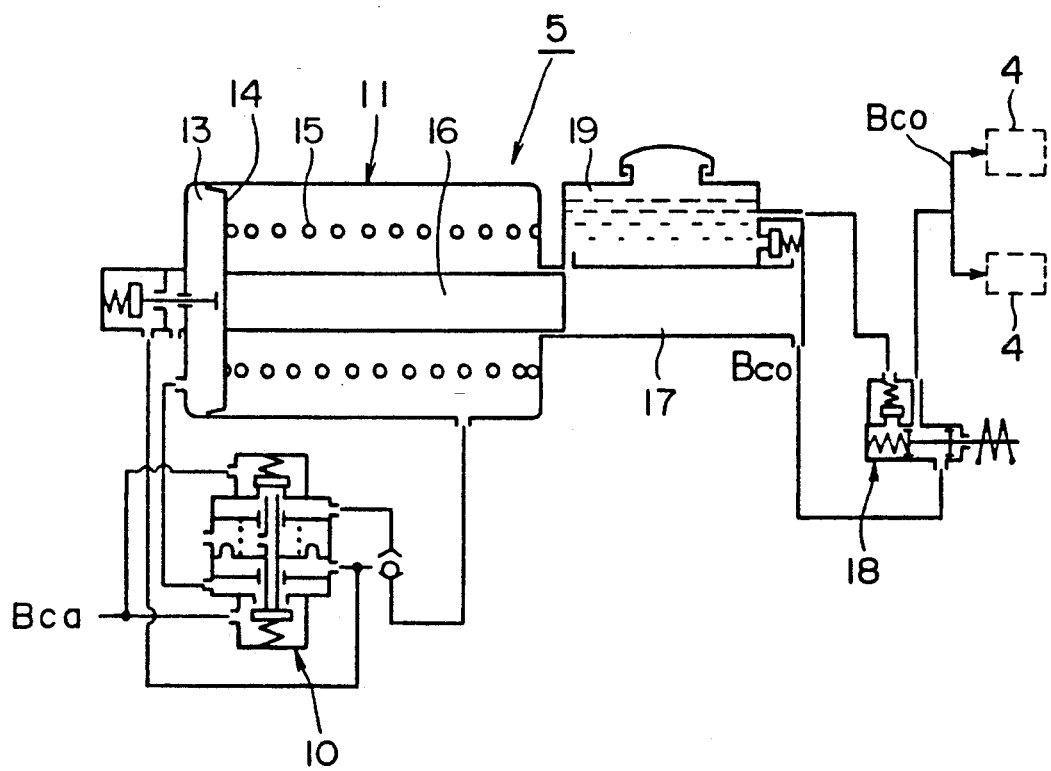
FIG. 3 is a schematic view of a conventional view of a pneumatic-to-hydraulic brake pressure transducer arrangement.

It will be appreciated that the pneumatic-to-hydraulic brake pressure transducer 30 is similar to a conventional pressure booster which has been previously explained with reference to FIG. 3.

The disc brake unit 31 which is employed for operation during running at high speed includes a brake head and appropriate brake pads or shoes suitable for effectively causing the satisfactorily deceleration of the railway vehicle from a high speed which falls within the range of three hundred and fifty kilometers per hour (350 kph) to one hundred and thirty kilometers per hour (130 kph).

The disc brake units 32 which are intended for moderate and low speed operation are constructed of conventional brake shoes or pads which are suitable for effectively decelerating a moving vehicle from relatively low speeds which fall within the range of one hundred and thirty kilometers per hour (130 kph) to zero kilometer per hour (0 kph). The disc brake unit 31 has a suitable caliper mechanism which carries respective disc brake shoes that are suitably mounted on a brake head body 31a. An oil supply port 31b is connected through an internal passageway or channel 31c to a movable piston member 31d. The two disc brake units 32 which are intended for moderate and low speed operation also include a suitable caliper mechanism which has two separate disc brake shoes that are mounted on brake heads 32a. An oil supply port 32b for accommodating pressurized fluid communicates with movable pistons 32d via an internal passageways or channels 32c.

As shown in FIG. 1, the electromagnetically operated control valve 33 is connected between a pressurized oil supply source and the disc brake unit 31 which is operated for high speed running and the disc brake units 32 which are operated for running at moderate and low speeds. In other words, it will be seen that an outlet port Bco of the hydraulic cylinder chamber 17 of brake pressure transducer 30 is initially connected to the inlet port of electromagnetic anti-skid valve 18 via a distribution or supply pipe 40. As shown, a distribution pipe 41 is connected from the outlet port of the anti-skid valve 18 to an inlet of the electromagnetic control valve 33, and a supply pipe 42 is connected from an outlet port of the electromagnetic control valve 33 to an inlet of the check valve 43. A pair of supply pipes 44 are connected from the two outlet ports of the check valve 43 to the inputs of the low speed brake units 32. Further, another supply pipe 45 is connected from another outlet of the electromagnetic control valve 33 to an inlet of a check valve 46. A supply pipe 47 is connected from an outlet port of the check valve 46 to the inlet of the disc brake unit 31. Thus, hydraulic fluid or oil may flow to the disc brake unit 31 which is intended to be used during high speed operation. Both of the check valves 43 and 46 have residual pressure check valve elements 43a and 46a, respectively. It will be noted that the anti-skid control valve 18 also is provided with a solenoid 18a and with a residual pressure check valve element 18b.

Now when the railroad vehicle is traveling at a high rate of speed, namely, is within the speed range of 350 to 130 kph, an electrical control signal is conveyed to a solenoid 33a whereby the spool valve is shifted to the right from the position as shown in FIG. 1. Accordingly, the interconnection between distribution pipes 41 and 42 is interrupted and a fluid communication path between pipe 41 to pipe 45 is established by control valve 33.

Figure 2:
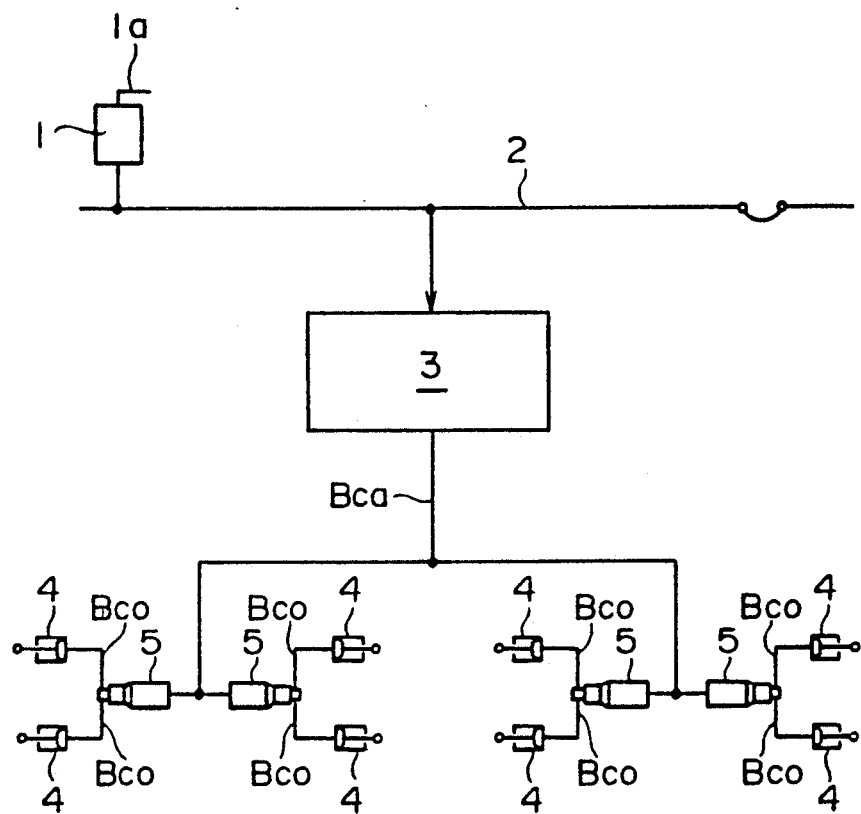
FIG. 2 is a schematic block diagram of a conventional railroad car disc brake arrangement.

The above-described brake control arrangement for a railroad car operates in such a manner that a pneumatic pressure signal Bca that is received from brake control unit 3, as shown and described with reference to FIG. 2 is converted into a hydraulic pressure signal Bco. That is, the pneumatic-to-hydraulic brake pressure transducer 30 converts the incoming pneumatic pressure Bca into an outgoing hydraulic pressure Bco. The hydraulic pressure is conveyed either to the disc brake 31 or to the disc brake units 32, whereby a corresponding braking action is produced on the railway vehicle. Let us assume that the railroad car is running at a moderate or low speed so that the electromagnetic control valve 33 is de-energized and its spool valve is in a first state or position as shown in the FIG. 1. Under this condition, the pressurized oil is supplied to the pistons 32d via inlet 32b and passageways 31c of disc brake units 32 which is intended for a moderate or low speed, whereby an appropriate braking force is produced. Now when railroad car is operating at a speed greater than 130 kph, an electrical control signal is applied to solenoid 33a of control valve 33. As a result, the solenoid 33a of the electromagnetic control valve 33 is energized and the spool valve is shifted to its second position for connecting pipe 41 to pipe 45. Accordingly, the hydraulic pressure is transmitted via port 31b and passageways 31c of disc brake unit 31 to the pistons 31d. This produces an appropriate brake force for retarding the railway vehicle. When, under the effect of a braking action, the railroad car reaches the above-mentioned intermediate or low speed range, the solenoid 33a is deenergized, and the control valve 33 returns to its initial first position, as shown in FIG. 1. Thus, the pressurized hydraulic fluid is supplied to disc brake units 32 for decelerating the vehicle from intermediate and low speeds. At the same time the residual pressurized oil on the inlet side of disc brake unit 31 is returned to the oil reservoir 19 via line 47, the check valve 46a, line 45, the control valve 33, lines 48 and 49. Similarly, the residual pressurized oil on the inlet side of the disc brake units 32 is returned to the oil reservoir 19 via lines 44, check valve 43a, control valve 33, line 41, anti-skid control valve 18, check valve 18b, and line 49 when the braking force is relieved by the retraction of the piston rod 16 by the compression spring 15.

Since the brake system for the railroad car as described above produces a hydraulic pressure by means of the pneumatic-to-hydraulic pressure transducer 30 and supplies under the command of that pressure the oil either to disc brake unit 31 or to disc brake units 32, depending on the speed at which the railroad car is traveling, it is possible to maintain the generation of a stable brake force suitable for high speed travel of railroad cars. Moreover, because two different disc brake devices 31 and 32 are capable of being operated from a single brake pressure transducer 30, it is possible to avoid any increase in the overall size of the brake system almost entirely.

The subject invention makes it possible to maintain the required brake force which is necessary for trains traveling at high speeds, yet employing a conventional brake system for low speed operation. Furthermore, since the control valve performs operating of the discrete high speed disc brake units and the remaining low speed disc brake units, one or both of the sets of these units always remains inactive so that the use of disc brake units unsuitable for the required operation is prevented which, in turn, minimizes any accelerated wear and damage of the braking apparatus.

The following is a nomenclature list of some of the components or elements shown and disclosed in the drawings and specification of the subject application:

1. Brake command controller
3. Brake control unit
4. Brake force cylinders
5. Booster cylinders
10. Pneumatic control valve brake pressure valve
11. Pneumatic cylinder
13. Pneumatic pressure chamber
14. Piston
15. Return spring
16. Piston rod
17. Hydraulic cylinder chamber
18. Anti-skid check valve
18a. Electrical solenoid
18b. Residual check valve
19. Hydraulic reservoir
30. Pneumatic-to-hydraulic brake pressure transducer
31. High speed brake unit
31d. Piston member
32. Low speed brake unit
32d. Piston member
33. Electromagnetic control valve
33a. Solenoid
43. First check valve
43a. Residual check valve
46. Second check valve
46a. Residual check valve Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

What I claim is:

1. A railroad car brake arrangement comprising; a pneumatic-to-hydraulic brake pressure transducer hydraulically connected to a brake control unit for developing braking pressure in response to a particular brake command request, a plurality of disc brake unit connected to said brake transducer, and being characterized by the fact that said disc brake units are divided into high speed and low speed disc brake units, and a control valve connected between said brake pressure transducer and said disc brake units, said control valve includes a solenoid, said solenoid is energized by the presence of an electrical control signal when the speed of the railroad car is greater than a predetermined value so that pressurized fluid is supplied from said brake pressure transducer to said high speed disc brake unit, and said solenoid is de-energized by the absence of said electrical control signal when the speed of the railroad car is less than the predetermined value so that pressurized fluid is supplied from said brake pressure transducer to said low speed disc brake units.

2. The railroad car brake arrangement as defined in claim 1, wherein said pneumatic-to-hydraulic brake transducer includes a pneumatically operated piston member for pressurizing hydraulic fluid.

3. The railroad car brake arrangement as defined in claim 2, wherein the energization of said solenoid of said control valve permits the return of hydraulic fluid from said low speed disc brake units to said brake pressure transducer.

4. The railroad car brake arrangement as defined in claim 3, wherein the energization of said solenoid causes the pressurization of hydraulic fluid in said high speed disc brake units.

5. The railroad car brake arrangement as defined in claim 3, wherein the de-energization of said solenoid causes the pressurization of hydraulic fluid in said low speed brake units.

6. The railroad car brake arrangement as defined in claim 1, wherein a first check valve is located between said control valve and said low speed disc brake units.

7. The railroad car brake arrangement as defined in claim 6, wherein a second check valve is located between said control valve and said high speed disc brake units.

8. The railroad car brake arrangement as defined in claim 7, wherein said pneumatic-to-hydraulic brake pressure includes a piston member which is operated by pneumatic pressure.

9. The railroad car brake arrangement as defined in claim 8, wherein said pneumatic-to-hydraulic brake pressure transducer includes a hydraulic reservoir.

10. The railroad car brake arrangement as defined in claim 9, wherein hydraulic fluid from said low speed and high speed disc brake units is returned to said hydraulic reservoir via a pair of residual pressure check valves.

11. The railroad car brake arrangement as defined in claim 2, wherein the de-energization of said solenoid of said control valve permits the return of hydraulic fluid from said high speed disc unit to said brake pressure transducer.

* * * * *